(12) United States Patent
Wu et al.

(10) Patent No.: US 10,585,770 B2
(45) Date of Patent: Mar. 10, 2020

(54) METHOD AND APPARATUS FOR ACCELERATING DATA RECONSTRUCTION FOR A DISK ARRAY

(71) Applicant: EMC Corporation, Hopkinton, MA (US)

(72) Inventors: Alan Zhongjie Wu, Beijing (CN); Colin Yong Zou, Beijing (CN); Chris Zirui Liu, Beijing (CN); Fei Wang, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/867,166

(22) Filed: Sep. 28, 2015

(65) Prior Publication Data

US 2016/0092326 A1    Mar. 31, 2016

(30) Foreign Application Priority Data

Sep. 30, 2014    (CN) .......................... 2014 1 0527635

(51) Int. Cl.
*G06F 11/00* (2006.01)
*G06F 11/20* (2006.01)
(Continued)

(52) U.S. Cl.
CPC .......... *G06F 11/2094* (2013.01); *G06F 3/064* (2013.01); *G06F 3/0619* (2013.01);
(Continued)

(58) Field of Classification Search
CPC ............. G06F 11/2094; G06F 11/1076; G06F 11/1662; G06F 3/064; G06F 3/0683; G06F 11/1008; G06F 3/0619
See application file for complete search history.

(56) References Cited

U.S. PATENT DOCUMENTS 5,499,253 A * 3/1996 Lary ................... G06F 11/1076
711/114
5,615,352 A * 3/1997 Jacobson ............... G06F 3/0601
711/114
(Continued)

FOREIGN PATENT DOCUMENTS

CN    101620518      1/2010
CN    102084330 A    6/2011
(Continued)

*Primary Examiner* — Marc Duncan
*Assistant Examiner* — Jonathan D Gibson
(74) *Attorney, Agent, or Firm* — BainwoodHuang

(57) ABSTRACT

A method, system, and computer program product for accelerating data reconstruction for a disk array, the disk array comprising a plurality of physical disks, the method, system, and computer program product including virtualizing the plurality of physical disks as a plurality of virtual disks, applying a data protection algorithm to the plurality of virtual disks to obtain redundant information on data to be stored, providing a map from the plurality of virtual disks to the plurality of physical disks, storing, based on the map, the data and the redundant information in the plurality of physical disks according to a predetermined allocation policy, and in response to at least one of the plurality of physical disks failing, implementing a data reconstruction for a disk array based on the redundant information and the data in working disks from amongst the plurality of physical disks.

15 Claims, 19 Drawing Sheets

(51) Int. Cl.
*G06F 3/06* (2006.01)
*G06F 11/16* (2006.01)
*G06F 11/10* (2006.01)

(52) U.S. Cl.
CPC ........ *G06F 3/0683* (2013.01); *G06F 11/1088* (2013.01); *G06F 11/1662* (2013.01)

(56) References Cited

U.S. PATENT DOCUMENTS

| | | | | |
|---|---|---|---|---|
| 5,666,512 | A * | 9/1997 | Nelson | G06F 11/2094 |
| | | | | 711/114 |
| 5,812,753 | A * | 9/1998 | Chiariotti | G06F 11/1076 |
| | | | | 714/54 |
| 7,330,932 | B2 * | 2/2008 | Yamamoto | G06F 11/1076 |
| | | | | 711/114 |
| 8,959,389 | B2 * | 2/2015 | Kulkarni | G06F 11/2094 |
| | | | | 714/6.22 |
| 9,117,488 | B1 * | 8/2015 | Pantel | G11B 20/1252 |
| 2010/0251012 | A1 * | 9/2010 | Zwisler | G06F 11/1092 |
| | | | | 714/6.32 |
| 2012/0084600 | A1 * | 4/2012 | Kidney | G06F 11/1088 |
| | | | | 714/6.13 |
| 2013/0332674 | A1 * | 12/2013 | Tanzawa | G06F 3/0689 |
| | | | | 711/114 |
| 2014/0304547 | A1 * | 10/2014 | Sugawara | G06F 11/1076 |
| | | | | 714/6.22 |
| 2014/0351512 | A1 * | 11/2014 | Xu | G06F 3/0604 |
| | | | | 711/114 |
| 2016/0179410 | A1 * | 6/2016 | Haas | G06F 3/0619 |
| | | | | 714/6.24 |

FOREIGN PATENT DOCUMENTS

| | | |
|---|---|---|
| CN | 102830942 | 12/2012 |
| CN | 102880428 A | 1/2013 |

* cited by examiner

METHOD AND APPARATUS FOR ACCELERATING DATA RECONSTRUCTION FOR A DISK ARRAY

RELATED APPLICATION

This application claims priority from Chinese Patent Application Number CN201410527635.7 filed on Sep. 30, 2014 entitled "METHOD AND APPARATUS FOR ACCELERATING DATA RECONSTRUCTION FOR A DISK ARRAY" the content and teachings of which is herein incorporated by reference in its entirety.

FIELD OF THE INVENTION

Embodiments of the present disclosure relate to information management.

BACKGROUND OF THE INVENTION

Generally, by organizing multiple disks into a disk array according to a certain pattern and scheme, it may possible to obtain a higher speed, better stability and larger storage capacity than a single disk. With disk capacity growing, data reconstruction time for a disk array, for example, a Redundant Array of Independent Disks (RAID) may become longer and longer.

For example, FIG. 1 shows trends of reconstruction time for serial advanced technology attachment (SATA) disks of different capacities in DDR. As shown in FIG. 1, it takes more than 14 hours for a 4 TB SATA disk to finish data reconstruction without any file system input/output (I/O) interference.

Longer reconstruction time may mean higher data loss risks, which may make RAID unavailable in large scale storage application area. Additionally, data reconstruction and file system I/O's may affect each other. Longer reconstruction time may make file system performance worse. On the other hand, heavy file system I/Os may make reconstruction time longer.

SUMMARY OF THE INVENTION

Embodiments of the present disclosure provide a method for accelerating data reconstruction for a disk array, the disk array comprising a plurality of physical disks by virtualizing a plurality of physical disks as a plurality of virtual disks; applying data protection to the plurality of virtual disks so as to obtain redundant information on data to be stored; providing a map from the plurality of virtual disks to the plurality of physical disks; storing, based on the map, the data and the redundant information in the plurality of physical disks according to a predetermined allocation policy; and in response to at least one of the plurality of physical disks failing, implementing data reconstruction for the disk array based on the redundant information and the data in working disks among the plurality of physical disks.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown For the purpose of illustration only, rather than for limiting. In the accompanying drawings.

DETAILED DESCRIPTION

Figure 1:
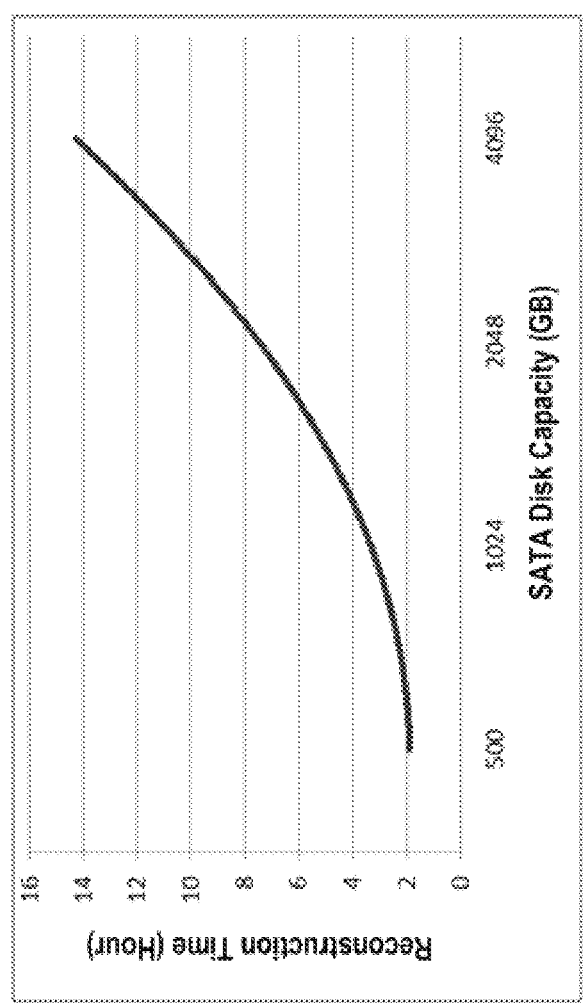
FIG. 1 shows an exemplary trends of reconstruction time for SATA disks of different capacities in DDR.

With reference to the figures, detailed description is presented below to various embodiments of the present disclosure. The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

A relatively large number of applications may require RAID and may be designed to have high reliability to protect user data. For example, a backup system may be the last defensive line for data, and one of its important responsibilities may be to make data stored on storage with high reliability, and even if hardware or software may have a problem, data may still be recovered from RAID. Therefore, shortening reconstruction time to enhance data protection may be a critical issue to address in RAID.

Embodiments of the present disclosure provide a method, an apparatus and a computer program product for accelerating data reconstruction for a disk array. In a further embodiment a disk array may include a plurality of physical disks. In a further embodiment data reconstruction may be performed by virtualizing a plurality of physical disks as a plurality of virtual disks. In a further embodiment data protection, for example a data protection algorithm, may be applied to a plurality of virtual disks so that redundant information may be obtained on data to be stored. In a further embodiment a map may be provided from a plurality of virtual disks to a plurality of physical disks. In a further embodiment based on the map, data and redundant information in a plurality of physical disks may be stored according to a predetermined allocation policy. In a further embodiment, in response to at least one of a plurality of physical disks failing, data reconstruction for the disk array may be implemented based on a redundant information and data in working disks among a plurality of physical disks.

In one exemplary embodiment, address space of each of a plurality of physical disks may be divided into a plurality of chunks, each of which has a same storage capacity. In a further embodiment, data and redundant information may be distributed in the chunks according to the predetermined allocation policy.

In one exemplary embodiment, address space of each virtual disk among a plurality of virtual disks may be divided into a plurality of blocks. In a further embodiment, each block may have the same storage capacity as each chunk.

In one exemplary embodiment, a map from a plurality of virtual disks may be provided to a plurality of physical disks. In a further embodiment a map may be provided from each of a plurality of blocks to a corresponding chunk in a plurality of chunks.

In one exemplary embodiment, a remap may be provided from each of a plurality of chunks to a corresponding block in a plurality of blocks.

In one exemplary embodiment, a plurality of virtual disks may be divided into a plurality of groups. In a further embodiment, a data protection algorithm may be applied to a plurality of virtual blocks. In a further embodiment a same or a different data protection algorithm may be applied to different ones of a plurality of groups.

In one exemplary embodiment, a predetermined number of spare chunks may be reserved for each of a plurality of physical disks. In a further embodiment, data reconstruction for the disk array may be implemented using these spare chunks.

In one exemplary embodiment, a plurality of physical disks may form a physical disk management domain. In a further embodiment, a plurality of virtual disks may form at least one data protection domain. In a further embodiment, a map from a plurality of virtual disks to a plurality of physical disks may be provided so that a physical disk management domain may be separated from a data protection domain.

One embodiment may provide an apparatus for accelerating data reconstruction for a disk array, wherein a disk array may include a plurality of physical disks. In a further embodiment, an apparatus may include a virtualizing unit that may be configured to virtualize a plurality of physical disks as a plurality of virtual disks. In a further embodiment, an apparatus may include an algorithm applying unit that may be configured to apply a data protection algorithm to a plurality of virtual disks so as to obtain redundant information on data to be stored. In a further embodiment, an apparatus may include a mapping unit that may be configured to provide a map from a plurality of virtual disks to a plurality of physical disks. In a further embodiment, an apparatus may include a storing unit that may be configured to store, based on a map, data and redundant information in a plurality of physical disks according to a predetermined allocation policy. In a further embodiment, an apparatus may include a reconstructing unit that may be configured to, in response to at least one of a plurality of physical disks failing; implement data reconstruction for a disk array based on redundant information and data in working disks among a plurality of physical disks.

In yet another embodiment of the present disclosure, there may be a computer program product provided for accelerating data reconstruction for a disk array. In a further embodiment, a computer program product may be tangibly stored on a non-transient computer-readable medium. In a further embodiment, a computer program product may include machine executable instructions, which when executed, may cause a machine to perform steps of the method as described above.

Figure 2:
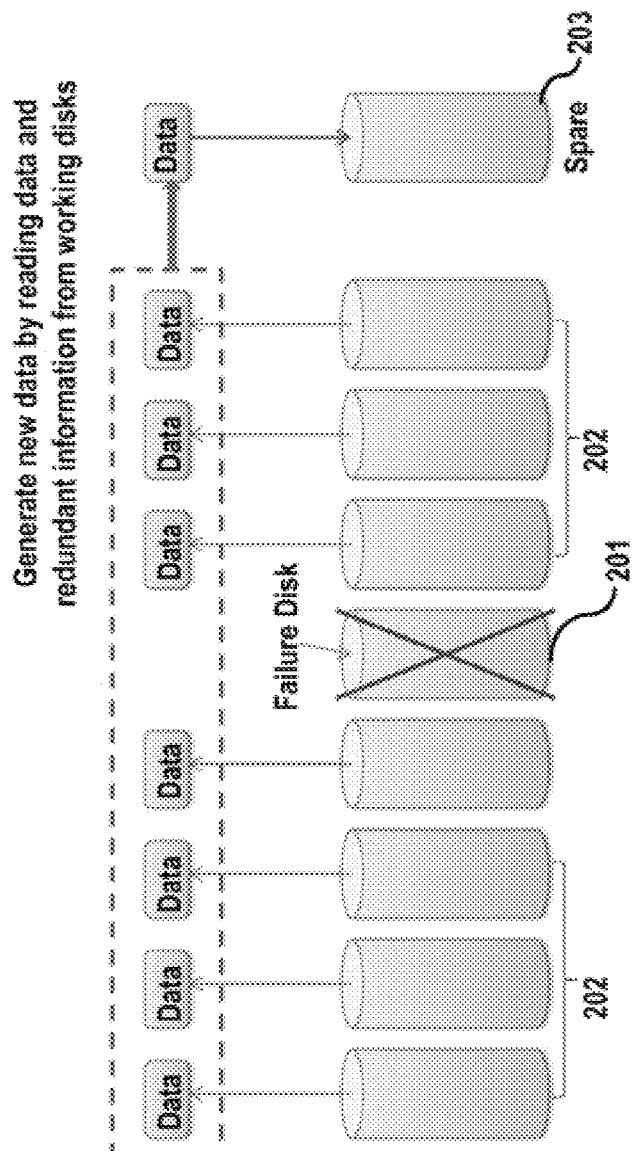
FIG. 2 schematically shows an exemplary data reconstruction process for traditional RAID.

By means of the embodiments of the present disclosure, if a physical disk may fail, all working disks among a plurality of physical disks may be configured to take part in data reconstruction for a failing/failed disk, thereby may greatly reduce data reconstruction time With reference to FIG. 2, schematically illustrating an exemplary data reconstruction process for a traditional RAID. FIG. 2 illustrates failure disk 201, working disks 203 (all working disks collectively), and spare disk 203. As shown in FIG. 2, data reconstruction process for a traditional RAID includes: reading data from working disks 202, recovering data and redundant information from working disks 202 and then writing recovered data to spare disk 203.

In one embodiment, as is well known, CPU resources may be sufficient for a storage system. In a further embodiment, recovering data from redundant information may usually not be a bottleneck of data reconstruction. In a further embodiment, reading data from working disks and writing recovered data into a spare disk may often be identified as bottlenecks of data reconstruction.

In one embodiment, in order to break the above read and write bottlenecks; typically some approaches may have been proposed without any change being made to current RAID architectures. In one embodiment, distributed spare disks may be able to break a write bottleneck. In a further embodiment, even if a write bottleneck may have been broken, reconstruction performance may not be improved too large extent because a read bottleneck may still exists, and it may be difficult to address a read bottleneck within a traditional RAID architecture.

In one embodiment, an advantage of a traditional RAID may be that the architecture thereof may be very simple and data location may be regular. In a further embodiment, in a traditional RAID architecture, physical disks forming RAID may be divided into multiple disk groups, each of which may be referred to as a disk group domain. In a further embodiment, a data protection algorithm may be applied to physical disks in each disk group, and redundant information may be obtained for the respective disk group. In a further embodiment, within a traditional RAID architecture, data protection algorithms may be applied in unit of disk group. In yet a further embodiment, various physical disks in a disk group to which a data protection algorithm may be applied may form a data protection domain, and the data protection domain may be the same as the disk group domain.

Figure 3:
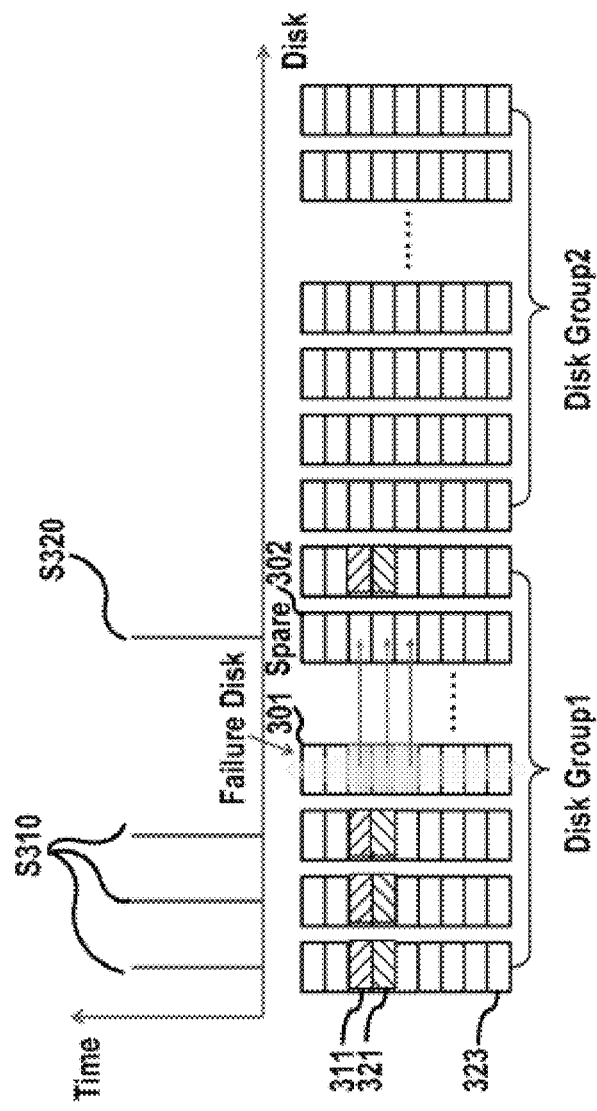
FIG. 3 shows an exemplary I/O distribution for traditional RAID reconstruction.

FIG. 3 shows an exemplary I/O (i.e., read/write) distribution for a traditional RAID reconstruction. In FIG. 3, multiple disks are divided into Disk Group1 and a Disk Group2. Data protection is performed on (applied to) the physical disks in Disk Group1 and Disk Group2 to obtain redundant information on respective disk groups. The redundant information obtained is stored on physical disks in a respective disk group. Each disk group includes at least one spare disk 302. Assuming a disk 301 in the Disk Group1 fails, then redundant information has to be first read from working disks in Disk Group1 (shown by a numeral S310 and an upper-left to lower-right shading 311.) Next, data is recovered from the read redundant information. Finally, the recovered data is written into spare disk 302 (as shown by a numeral S320 and an upper-right to lower-left shading 321.) In the exemplary embodiment of data reconstruction illustrated in FIG. 3, Disk Group2 does not take part in the data reconstruction for the Disk Group1, because redundant information for reconstructing data in Disk Group1 is not stored in Disk Group2.

In one embodiment, there may be more than 2 disk groups. In a further embodiment, data protection may be applied using a data protection algorithm, for example, RAID-5 algorithm or RAID-6 algorithm. In a further embodiment, data protection algorithm may be applied to physical disks in disk groups.

In certain embodiment, reading data from working disks and write the recovered data into a spare disk may be bottlenecks for the traditional RAID. In a further embodiment, a read bottleneck may be hard to be broken without changing current RAID architectures.

In one embodiment of the present disclosure a virtual storage solution for physical disks may be proposed. In a further embodiment, a plurality of physical disks forming a disk array may be virtualized as a plurality of virtual disks. In a further embodiment, a data protection algorithm may be applied to a plurality of virtual disks to obtain redundant information on data that may be stored. In a further embodiment, a map from a plurality of virtual disks to a plurality of physical disks may be provided, based on which data and redundant information may be randomly stored in a plurality of physical disks. In a further embodiment, a data protection domain may be formed by a plurality of virtual disks to which a data protection algorithm may be applied. In a further embodiment, a data protection domain may be separated from a physical disk management layer formed by a plurality of physical disks where data may be stored. In a further embodiment, data and redundant information may be randomly stored in a plurality of physical disks. With a virtual storage solution according to embodiments of the present disclosure, when a physical disk may fail, all working disks in a plurality of physical disks may be configured to participate in the data reconstruction for the failure disk.

In a further embodiment, a virtual storage solution may dramatically reduce data reconstruction time.

With reference to FIGS. 4 to 10, detailed description is presented below with respect to a virtual storage solution according to embodiments of the present disclosure. For sake of clarity and in this description, storage architecture according to embodiments of the present disclosure is hereinafter referred to as "Data Domain Virtual Storage (DDVS)" architecture.

Figure 4:
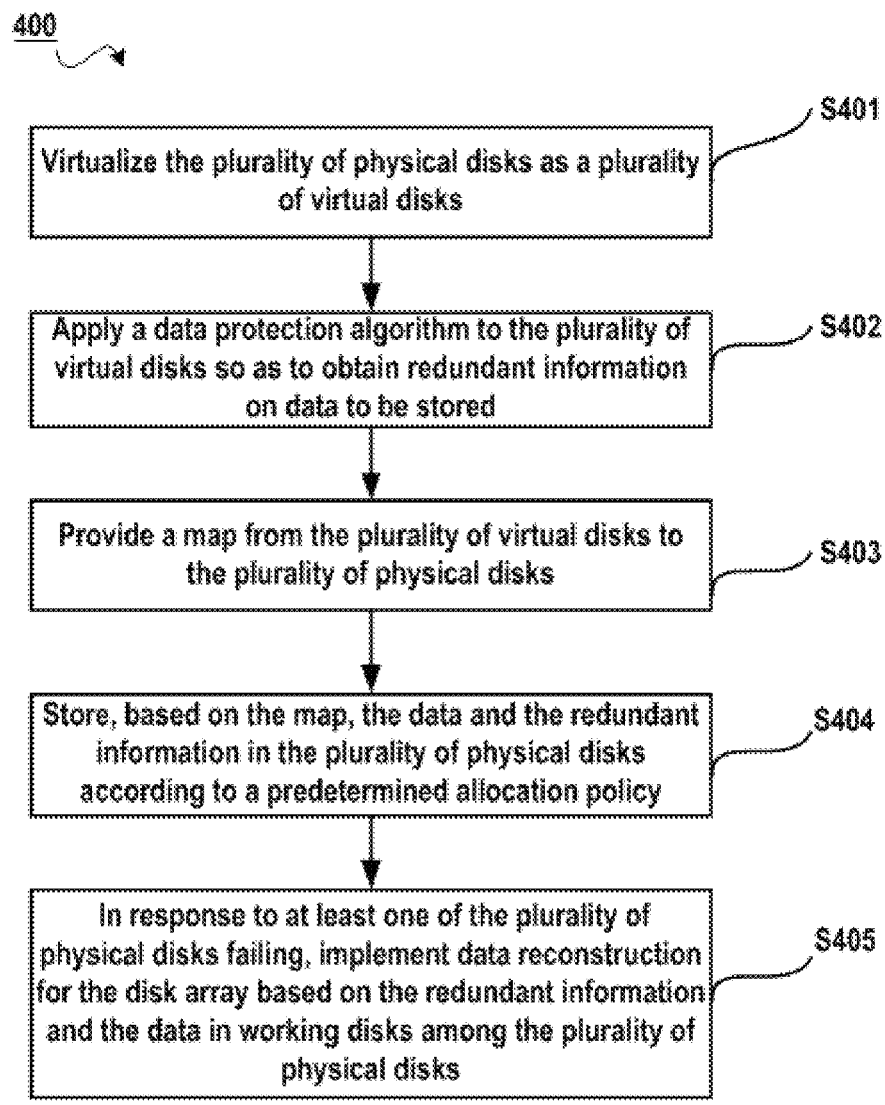
FIG. 4 shows an exemplary flowchart of a method 400 for accelerating data reconstruction for a disk array according to one embodiment of the present invention.

With reference to FIG. 4, that shows an exemplary flowchart of a method 400 for accelerating data reconstruction for a disk array according to an embodiment of the present disclosure. The disk array comprises a plurality of physical disks, which may have the same or different storage capacities. The embodiment of the present disclosure is not limited in this regard. With reference to FIG. 4, a plurality of physical disks are virtualized as a plurality of virtual disks, wherein a user view is restricted to a plurality of virtual disks (Step S401). A data protection algorithm is applied to a plurality of virtual disks to obtain redundant information on data to be stored (Step S402).

A map from the plurality of virtual disks to the plurality of physical disks is provided (Step S403). With the map, a logical address of a virtual disk can be converted into a real address of a corresponding physical disk, so that data and redundant information are stored in the plurality of physical disks according to a predetermined allocation policy (Step S404).

In response to at least one physical disk of the plurality of physical disks failing, data reconstruction for a disk array is implemented based on data and redundant information in working disks among the plurality of physical disks (Step S405).

In one embodiment, from a user's point of view only a plurality of virtual disks may be visible rather than physical disks being visible. In a further embodiment, a data protection algorithm includes but is not limited to: RAID-5 algorithm, RAID-6 algorithm, erasure code-related data protection algorithm. In a further embodiment, it may be understood that the obtained redundant information may depend on the data protection algorithm that may be applied/used. In an exemplary embodiment, where a RAID-5 algorithm may be applied, a redundant information obtained may be a checksum value, and the checksum value may be obtained by applying bitwise exclusive OR operation to a data.

In one embodiment of the present disclosure, a predetermined number of spare spaces may be reserved for each of a plurality of physical disks. In a further embodiment, implementing data reconstruction for a disk array may include using a reserved spare space to implement data reconstruction for a disk array. In a further embodiment, where at least one physical disk may fail, data and redundant information may be read in parallel from working disks among a plurality of physical disks. In a further embodiment, data may be recovered using a read data and redundant information. In yet a further embodiment, recovered data may be stored in a reserved spare space, thereby implementing a data reconstruction for a disk array.

Figure 5:
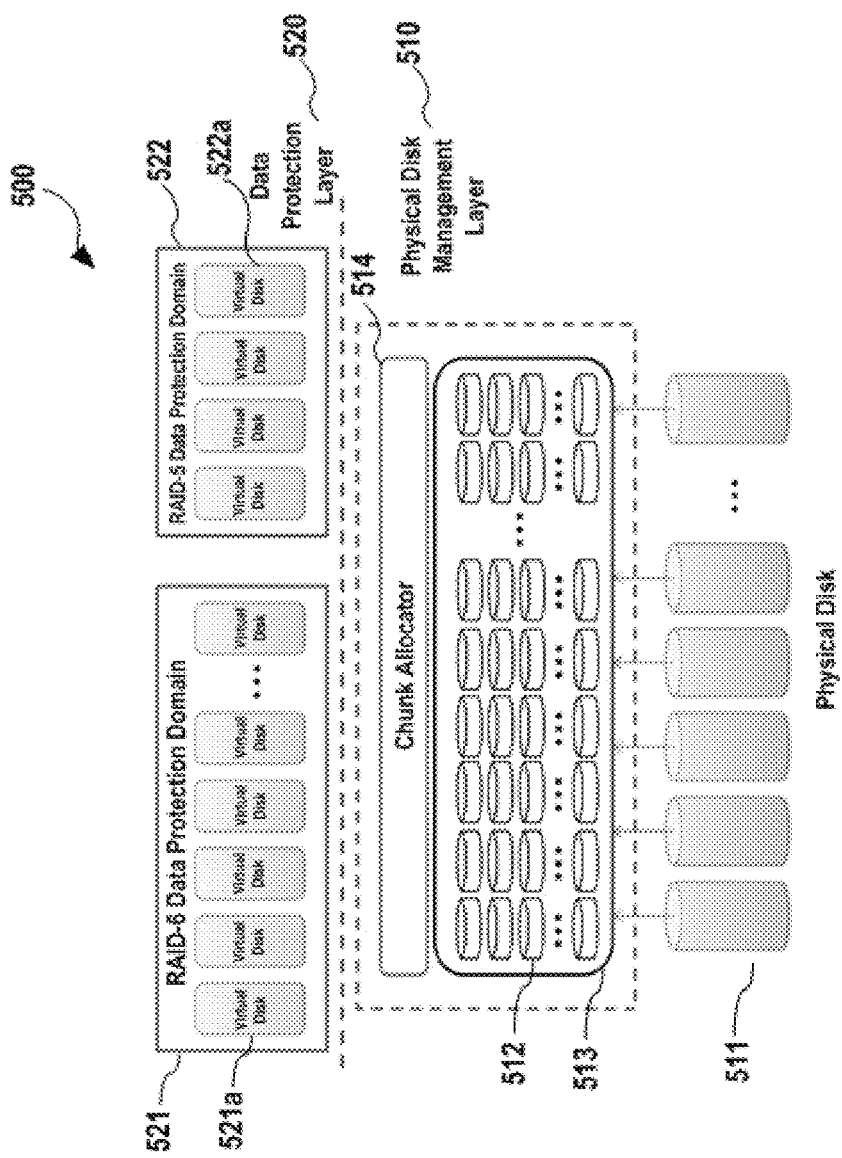
FIG. 5 shows an exemplary DDVS architecture 500 obtained according to one embodiment of the present invention.

FIG. 5 shows an exemplary DDVS architecture 500 obtained according to one embodiment of the present disclosure. As shown in FIG. 5, the DDVS architecture 500 comprises a physical disk management layer 510 and a data protection layer 520.

The physical disk management layer 510 (also referred to as a "physical disk management domain") is configured to manage a plurality of physical disks forming a disk array 511

(a plurality of physical disks). An address space of each of the plurality of physical disks 511 is divided into a plurality of chunks 512 (collectively denoting the chunks), each of which has a same storage capacity forming a storage pool 513.

A data protection layer 520 is configured to provide data redundancy features. The data protection layer 520 comprises a plurality of virtual disks resulting from virtualization of the plurality of physical disks 511. A data protection algorithm is applied to the plurality of virtual disks to obtain redundant information on data to be stored. As such, the data protection layer 520 formed by the plurality of virtual disks is also referred to as a data protection domain 520.

In one embodiment, when there are a large number of virtual disks, the plurality of virtual disks may be divided into a plurality of groups, and the same or different data protection algorithms may be applied to each group. As illustrated in FIG. 5, the plurality of virtual disks are divided into two groups for illustration, namely group 521 and group 522. Virtual disks 521*a* are collectively grouped in group 521, and virtual disks 522*a* are collectively grouped in the group 522. Different data protection algorithms are applied to the groups 521 and 522. RAID-6 algorithm is applied to the group 521, and RAID-5 algorithm is applied to the group 522. Group 521 to which RAID-6 algorithm is applied is referred to as a RAID-6 data protection domain. Similarly Group 522 to which RAID-5 algorithm is applied is referred to as a RAID-5 data protection domain. The RAID-6 data protection domain and the RAID-5 data protection domain are collectively referred to as a data protection domain 520.

The address space of each of a plurality of virtual disks 521*a* and 522*a* is divided into a plurality of blocks (not shown). The physical disk management layer 510 further includes a chunk allocator 514 for mapping blocks in the data protection layer 520 to corresponding chunks 512 in the physical disk management layer 510.

In one embodiment, each of the plurality of blocks may have the same storage capacity as each chunk. In a further embodiment, each of the plurality of blocks may have a different storage capacity from each chunk. In one embodiment, it may be understood that for illustration purposes that a plurality of virtual disks may be divided into two groups. In a further embodiment, a different data protection algorithm may be applied to each group. In one embodiment, a plurality of virtual disks may not be divided into groups. In a further embodiment, a same data protection algorithm may be applied to two groups, such as RAID-5, RAID-6, or erasure code-related data protection algorithm.

Figure 6:
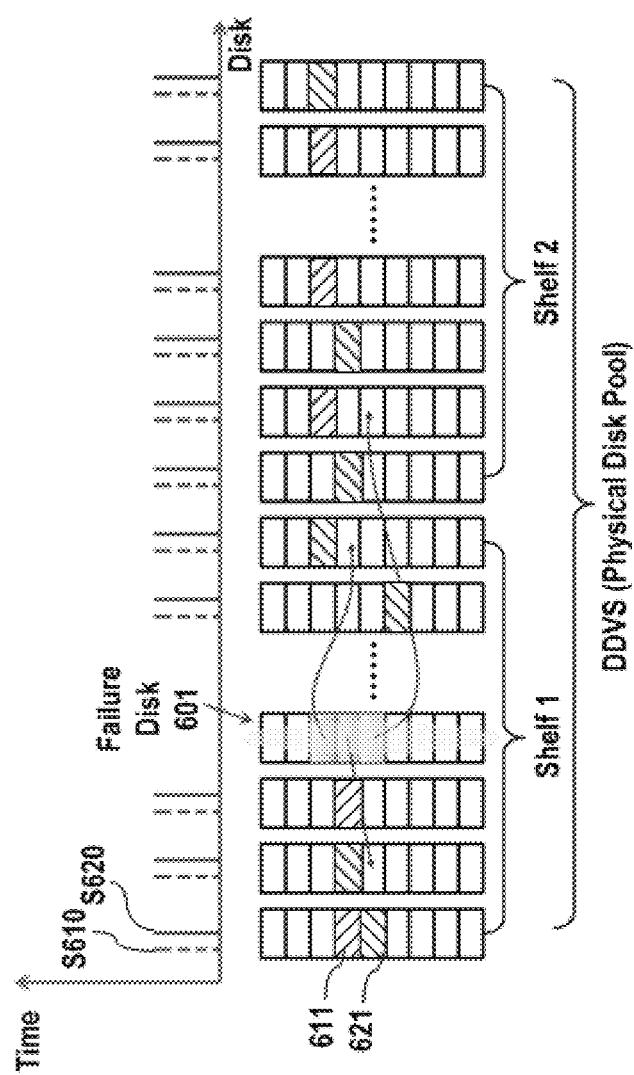
FIG. 6 shows an exemplary data reconstruction I/O distribution for DDVS architecture.

FIG. 6 shows an exemplary data reconstruction I/O distribution within DDVS architecture. In the upper half of FIG. 6, dashed vertical lines (as shown by a numeral S610) represent read operations, while solid vertical lines (as shown by a numeral S620) represent write operations. In the lower half of FIG. 6, upper-left to lower-right shadings (as shown by a numeral S611) represent read operations, while upper-right to lower-left shadings (as shown by a numeral S621) represent write operations. Once a physical disk 601 fails, a data reconstruction process will be initiated. Redundant information is read from working disks, as shown by a numeral S610 and the upper-left to lower-right shading 611. Subsequently, data is recovered from the read data and redundant information. Then, the recovered data is written into spare chunks reserved for each physical disk, as shown by the numeral S620 and the upper-right to lower-left shading 621. As illustrated in FIG. 6, once one physical disk fails, all physical disks will be involved into data reading and/or writing, i.e., all physical disks will have data reconstruction I/O's. Therefore, read and write bottlenecks can be broken, and reconstruction performance can be improved significantly.

In one embodiment, a plurality of physical disks form a physical disk management domain, a plurality of virtual disks form at least one data protection domain, and a map from a plurality of virtual disks to a plurality of physical disks may be provided such that the physical disk management domain may be separated from the data protection domain. In a further embodiment, a physical disk management domain may be loosely coupled with the data protection domain. In this way, at least one of the following benefits may be achieved.

1) In one embodiment reconstruction time may be dramatically/greatly reduced. In a further embodiment, DDVS may distribute data into chunks of all physical disks in the storage pool. In a further embodiment, one of the physical disks may fail, in that case all physical disks export from the storage pool may start data reconstruction to recover data for the failed disk. Since all chunks in the storage pool may help in reconstruction, and redundant information may be distributed across chunks of all physical disks, the read bottleneck in the data reconstruction process may be broken, and reconstruction performance may be significantly improved.

2) In another embodiment performance may be consistent. In a further embodiment, in a traditional RAID architecture, (as shown in FIG. 3), data reconstruction I/O's may be only implemented in the Disk Group1 to which the failure disk may belong. In a further embodiment, the concentration of data reconstruction I/O's in the Disk Group1 may severely affects file system I/Os, so that file system I/O's may need to be adjusted according to data reconstruction I/O's. In a further embodiment, file system I/O's may be hardly separated from data reconstruction I/O's. In a further embodiment, in DDVS (as shown in FIG. 6), data reconstruction I/O's may be distributed across various physical disks, and thus the data reconstruction I/O's may not affect file system I/O's. In a further embodiment, file system I/O's may be separated from data reconstruction I/O's. In a further embodiment, system performance with data reconstruction being performed may be consistent with the system performance with data reconstruction not being performed.

Figure 7:
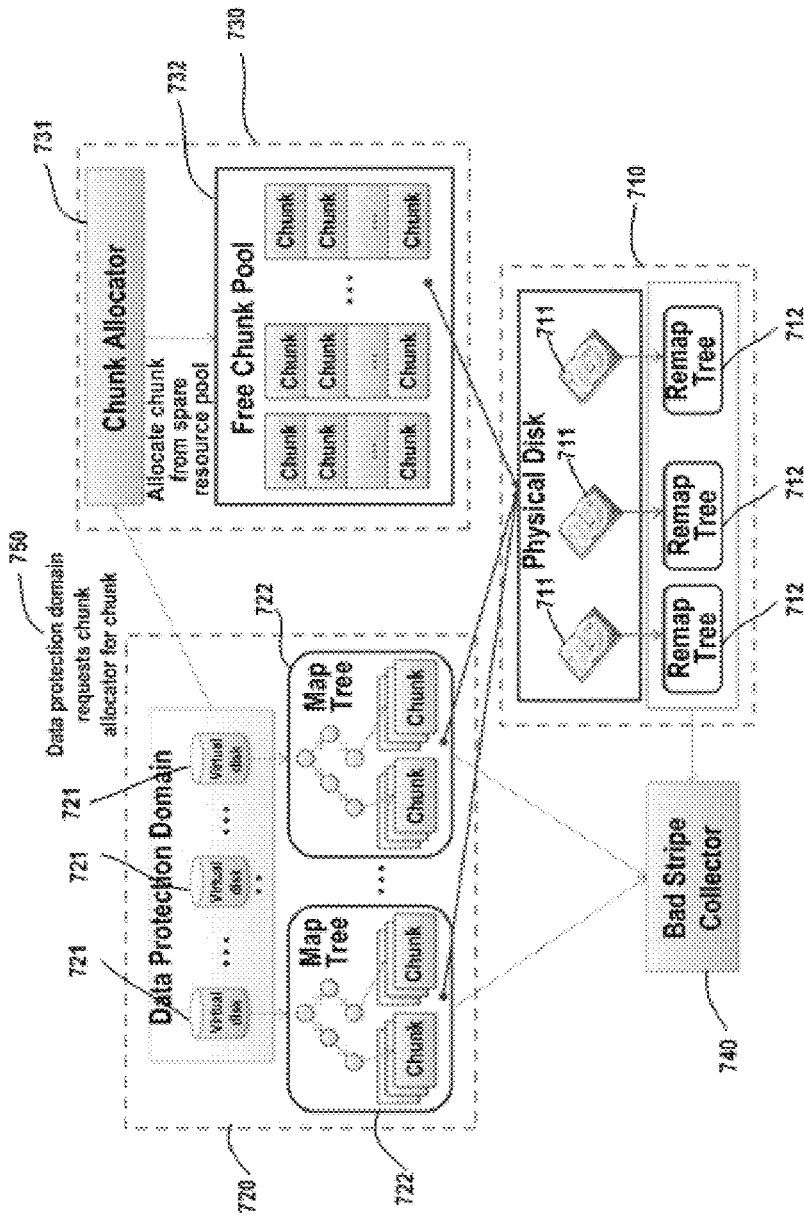
FIG. 7 shows one exemplary implementation of the DDVS architecture shown in FIG. 5.

FIG. 7 shows one exemplary implementation of the DDVS architecture as shown in FIG. 5.

From the implementation's point of view, the DDVS architecture as shown in FIG. 7 comprises three parts: physical disk management module 710, data protection domain module 720 and chunk allocator module 730.

Physical disk management module 710 is configured to manage plurality of physical disks 711 and to maintain chunk resources of each physical disk used by the data protection domain. Physical disk management module 710 includes plurality of physical disks 711 and associated remap tree 712. Plurality of physical disks 711 are virtualized as plurality of virtual disks 721. The address space of each physical disk 711 is divided into a plurality of chunks and each chunk has the same storage capacity.

Data protection domain module 720 comprises plurality of virtual disks 721 and associated map tree 722. For the purpose of illustration, in the embodiment shown in FIG. 7, plurality of virtual disks 721 forms one data protection domain, but it should be understood that the embodiments of the present disclosure are not limited to this. The address space of each virtual disk 721 is divided into a plurality of blocks (not shown) and each block has the same storage capacity as each chunk.

Each virtual disk 721 is created to have no physical storage resources initially. During data write process, storage resources are allocated on demand by chunk allocator module 730 according to a predetermined allocation policy. In other words, during the data write process, chunk allocator module 730 allocates, according to the predetermined allocation policy, corresponding chunks to virtual disks 721 based on the data amount which the user desires to write into blocks of virtual disks 721 so as to write data into the corresponding chunks. The blocks and the chunks are not bound together in a fixed manner but may be loosely coupled with each other.

For virtual disks 721, the traditional RAID algorithm (for example, RAID-5/RAID-6 algorithm) or an erasure code-related algorithm may be applied so as to protect data with redundancy. Each virtual disk 721 has one associated map tree 722 describing which block(s) in the virtual disk 721 has been mapped to chunk(s) in physical disk 711. During read/write process, map tree 722 needs to be accessed to check whether the accessed block has been mapped to a chunk. For example, a radix tree or a B+ tree can be used to implement map tree 722.

Accordingly, each physical disk 711 has one associated remap tree 712 for describing which chunk(s) in physical disk 711 has been mapped to a block in virtual disk 721. For example, remap tree 712 may be implemented with a radix tree.

Chunk allocator module 730 is configured to decide data layout on a physical disk for each data protection domain. Chunk allocator module 730 comprises chunk allocator 731 and associated free chunk pool 732. Free chunk pool 732 maintains all chunks of each physical disk 711 that are not mapped to blocks. In response to a request from a virtual disk, chunk allocator 731 allocates chunks for the virtual disk from free chunk pool 732.

In write process, if a block in virtual disk 721 has not been mapped to a chunk, then chunk allocator 731 needs to allocate one chunk for this block according to a certain algorithm. Unlike a volume storage resource allocator in a traditional RAID, chunk allocator 731 has the following two different requirements.

1) Different stripe units (SUs) inside a stripe cannot be distributed in the same physical disk, which requires that a plurality of chunks allocated by chunk allocator 731 at a time should not be distributed in the same physical disk. To this end, chunk allocator 731 may adopt a conflict check mechanism. There exists a plurality of known conflict check mechanisms.

2) Data layout on the physical disk should be distributed randomly, so all physical disks will participate in data reconstruction and the reconstruction performance may be improved. Chunk allocator 731 uses the pseudo-random algorithm, to randomly allocate chunks for virtual disks (blocks). With this algorithm, data can be distributed across all disks randomly. It may be understood that the pseudo-random algorithm is merely one example of allocation policies, which chunk allocator 731 may use, and it does not mean limiting the scope of the present disclosure.

The DDVS architecture as shown in FIG. 7 further includes bad stripe collector 740, which collects bad stripes for the data protection domain based on all map trees 722 and remap trees 712. A description of the bad stripe collector will be presented below with reference to FIG. 10.

Figure 8:
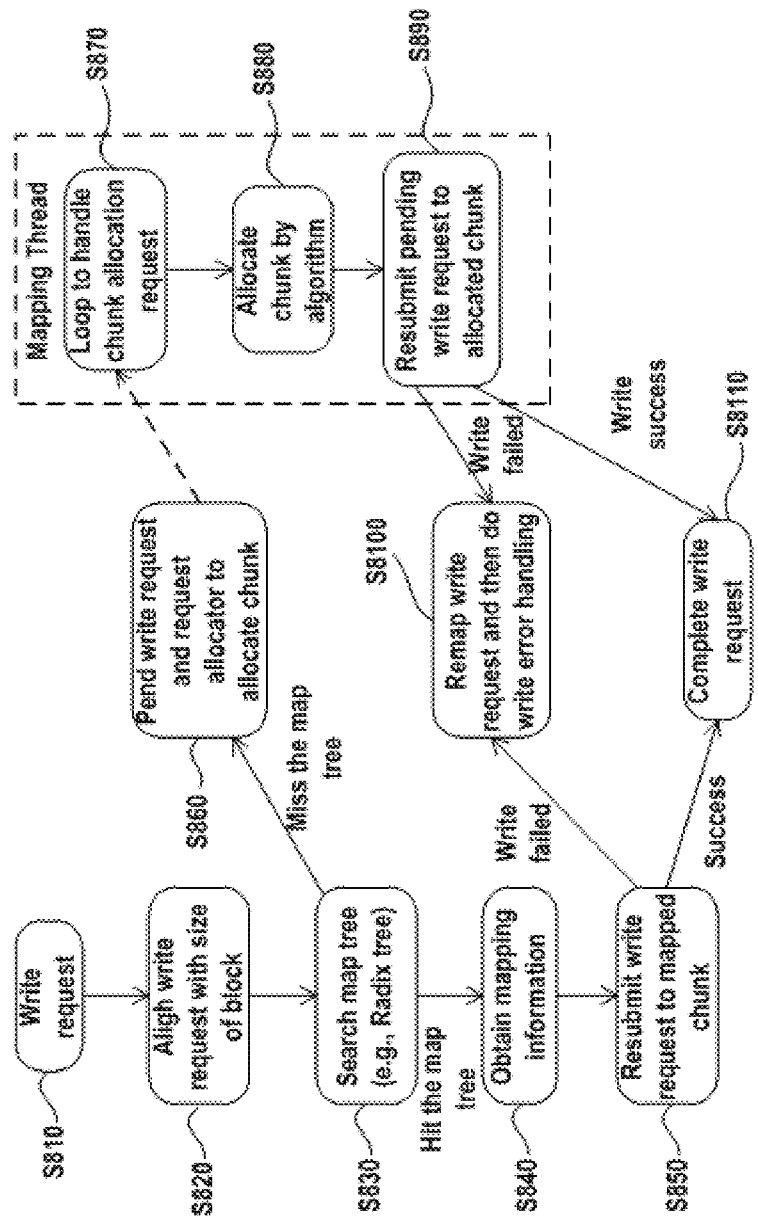
FIG. 8 shows an exemplary data write process 800 for one data protection domain in DDVS.
Figure 9:
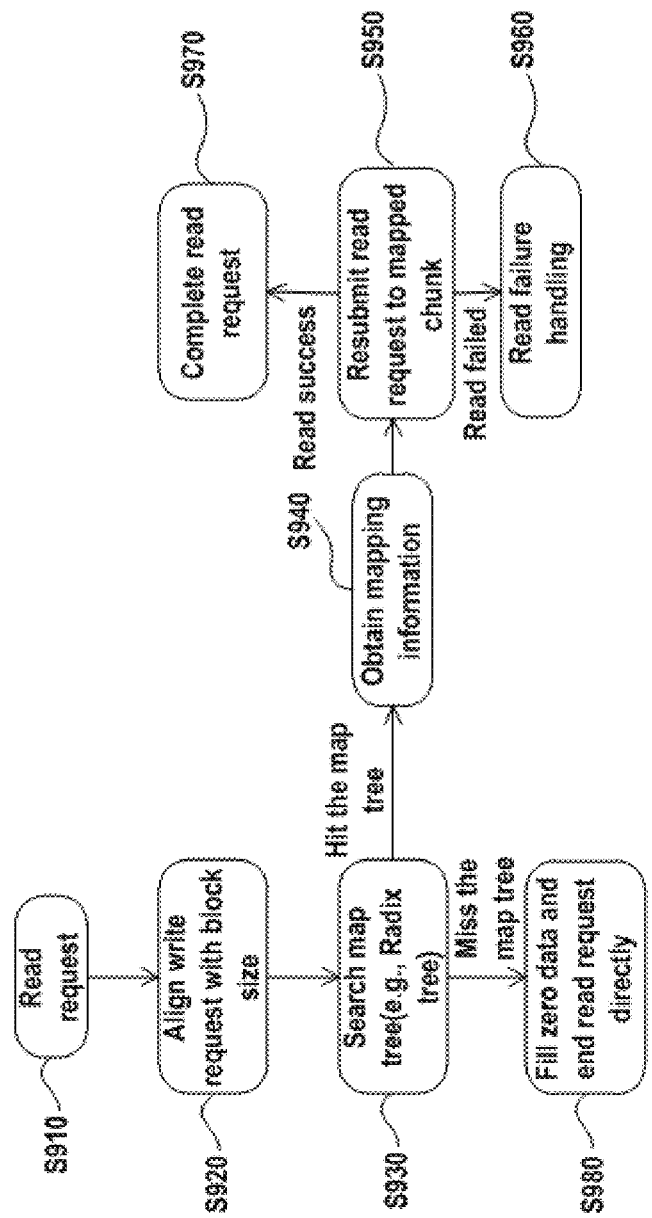
FIG. 9 shows an exemplary data reading process 900 for one data protection domain in DDVS.
Figure 10:
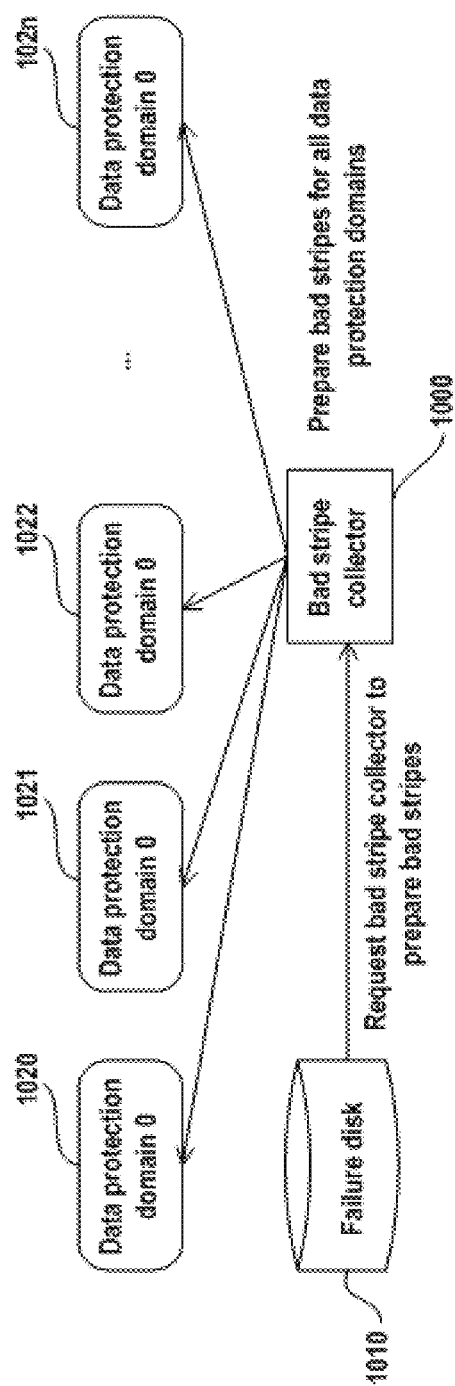
FIG. 10 shows an exemplary bad stripe collector 1000 used in DDVS data reconstruction.

With reference to FIGS. 8-10, description is presented below to data write, read and reconstruction process based on DDVS.

FIG. 8 shows data write process 800 with respect to one data protection domain in DDVS. It should be understood that where DDVS comprises a plurality of data protection domains, the process as shown in FIG. 8 may be executed in parallel with respect to each data protection domain.

As shown in FIG. 8, in step S810 a write request is received, and according to a data protection algorithm being used, the write request is divided into a plurality of sub-requests and written into a virtual disk. If the write request is not directed to a full stripe, a corresponding read operation will be triggered. Operations in this step are the same as in the traditional RAID. In step S820, the write request (including an address of the stripe) entering the virtual disk is first aligned with the size of the block in the virtual disk. If the write request cannot be aligned with the size of the block, the write request is divided into two parts In one embodiment, in DDVS, data protection algorithm may be applied on a plurality of virtual disks, i.e., RAID may be implemented based on a plurality of virtual disks in DDVS. In a further embodiment, in the RAID creation process, the configuration program may divide the storage space of each virtual disk into a plurality of stripes. In a further embodiment, the size of each stripe may be $2^N$ sectors, wherein N is a positive integer. In a further embodiment, the size of the stripe might not be aligned with the size of the block.

Reference is now made back to FIG. 8, wherein after the write request is aligned with the size of the block of the virtual disk, and in step S830, a map tree for the virtual disk is searched with respect to the write request, and a logical address of the accessed virtual disk is used as a keyword for searching the virtual disk.

If the map tree is hit (discovered/uncovered/struck), it means the block has been mapped to a chunk of a physical disk, and then in step S840, mapping information is obtained from the map tree.

In step S850, the write request is re-submitted to the mapped chunk according to the mapping information obtained. After I/O's are dispatched, the flow proceeds to step S8100 or S8110.

If the map tree is not hit, it means the block has not been mapped to a chunk of a physical disk, and the process proceeds to step S860, where a write request is pending and a mapping thread is triggered to allocate a chunk for the accessed block. Subsequently, the mapping thread is performed (as shown in the right side of FIG. 8). The mapping thread can be a kernel daemon, which responds to a request of the block to perform chunk mapping, and the core of the mapping thread is the chunk allocator (described above).

In step S870, a loop is performed so as to handle a chunk allocation request.

In step S880, the chunk allocator allocates a chunk for the block using the pseudo-random algorithm.

After allocating the chunk, the pending write request is re-submitted to the allocated chunk with the information on the newly allocated chunk (e.g., physical address), as shown in step S890.

In steps S850 and S890, if write on the physical disk fails, data reconstruction should be triggered to process the physical disk failure event, and meanwhile, the write request may be remapped to other working disk by the chunk allocator, as shown in step S8100.

In steps S850 and S890, if write on the physical disk succeeds, the write request is completed, as shown in step S8110.

FIG. 9 shows an exemplary embodiment of a data reading process 900 with respect to one data protection domain in DDVS. Where DDVS comprises a plurality of data protection domains, the process shown in FIG. 9 may be executed in parallel with respect to each data protection domain.

As shown in FIG. 9, a read request is received (step S910.)

The read request entering a virtual disk is aligned with the size of a block of the virtual disk (Step S920.) If the read request cannot be aligned with the size of the block, the read request is divided into two parts.

After aligning the read request with the size of the block of the virtual disk (Step S930,) a map tree of the virtual disk is searched with a logical address of the accessed block so as to obtain mapping information on the block.

If the map tree is hit, the mapping information on the block is obtained (Step S940).

The read request is re-submitted to the mapped chunk according to the obtained mapping information (Step S950.)

If read fails, read failure processing is performed with respect to the data protection domain (Step S960.) If read succeeds, the read request is completed (Step S970.)

If the map tree is not hit (Step S930,) data will not be filled and the request is completed directly (Step S980.)

With reference to FIG. 10, description is presented to an exemplary data reconstruction process of DDVS. FIG. 10 shows an exemplary bad stripe collector 1000 used in data reconstruction for DDVS.

In one embodiment, once a physical disk failed, reconstruction may be triggered to recover data. In an embodiment with a traditional RAID, data reconstruction may be simple. In one embodiment, once a physical disk failed, spare physical disks may be selected to do reconstruction. In a further embodiment in DDVS, no spare physical disks exist, but spare spaces are reserved in all physical disks.

Reference is now made to FIG. 10, wherein the reconstruction process for DDVS can be described as below.

1) The failure of one physical disk will cause a number of stripes to be corrupted in all data protection domains in DDVS, because the DDVS is distributing data across all physical disks in DDVS. Bad stripe collector 1000 should be run once a physical disk fails. The purpose of bad stripe collector 1000 is preparing bad stripes for all data protection domains. As shown in FIG. 10, failure physical disk 1010 will request bad stripe collector 1000 to prepare bad stripes. In response to the request from failure physical disk 1010, bad strips collector 1000 prepares bad stripes for data protection domains 1020, 1021, 1022 . . . 102n.

2) After all bad stripes have been prepared for all data protection domains; a reconstruction daemon for each data protection domain can be run in parallel.

As can be seen from the foregoing description, in one embodiment, failure of one physical disk may cause all data protection domains to take part in data recovery. Additionally in another embodiment, data in the data protection domain may be distributed across all physical disks randomly. In a further embodiment, all physical disks may take part in data recovery.

In one embodiment, distributing data randomly across all physical disks and bringing all data protection domains into data recovery may improve reconstruction performance significantly.

Figure 11:
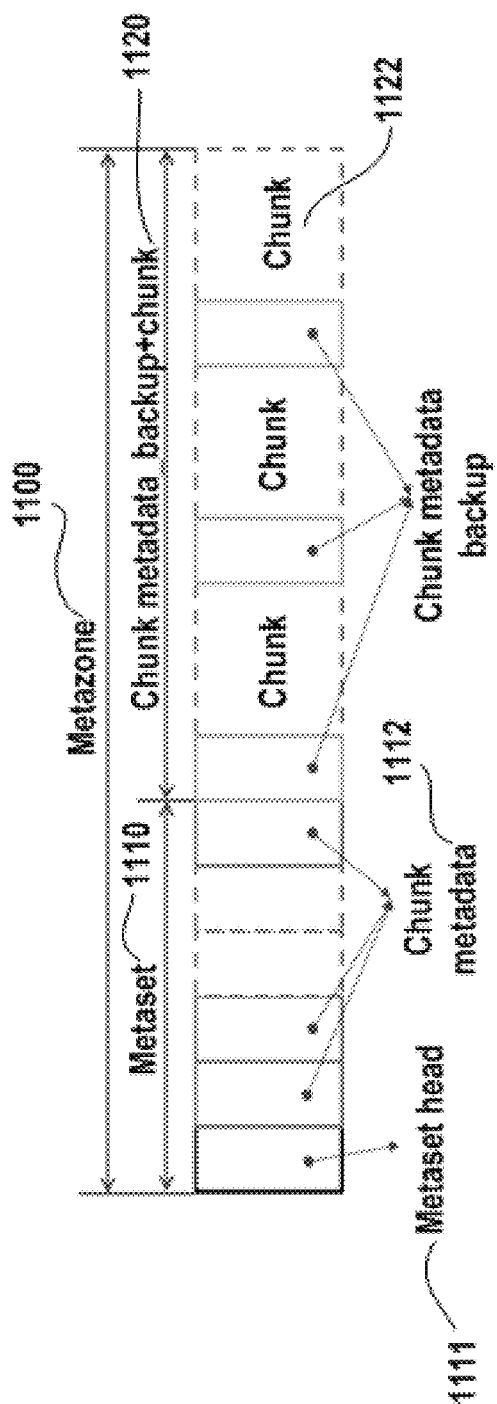
FIG. 11 shows an exemplary metadata layout on a physical disk in DDVS.

FIG. 11 shows an exemplary metadata layout on a physical disk in DDVS. In one embodiment, mapping information between virtual disks and physical disks (including mapping information between blocks and chunks) may need to be stored on physical disks as metadata. In another embodiment, after the system may be rebooted, metadata may be read from the physical disks to do DDVS reassembly. In one embodiment, metadata may affect data reliability. In a further embodiment, data may be lost, and on loss of data, data corruption may occur. In a further embodiment, in order to make metadata stay reliable on the physical disks, a redundant metadata area may be designed.

Reference is now made to FIG. 11, wherein in order to manage the large scale disk capacity, metazone 1100 is defined. Each physical disk has plurality of metazones 1100. Metazone 1100 comprises metaset zone 1110 and chunk metadata backup and chunk zone 1120. Metazone 1100 comprises metaset head 1111 and chunk metadata zone 1122. Chunk metadata backup and chunk zone 1120 comprises chunk metadata backup zone 1121 and chunk zone 1122. Chunk metadata backup zone 1121 is ahead of each chunk zone 1122. Thereby, data reliability is increased using chunk metadata zone 1112 and chunk metadata backup zone 1121.

Chunk metadata is updated in sync mode during the chunk allocation stage. In order to make metadata in chunk metadata backup zone 1121 and metadata in chunk metadata zone 1112 consistent, chunk metadata backup zone 1121 should be updated first, and then chunk metadata zone 1112 is updated. During the system booting stage, metadata should be read from chunk metadata zone 1112 rather than from chunk metadata backup zone 1121, except if metaset zone 1110 has been corrupted.

With reference to FIGS. 12 to 17, description is presented below to an embodiment of evaluation results of the DDVS architecture.

In one embodiment, with the method as disclosed, DDVS prototype may be realized in the Linux kernel and evaluations of overhead, performance and reconstruction time may have been completed. In a further embodiment, DDVS prototype may be realized in DataDomain product (data backup product from EMC company), and a comparison in performance and reconstruction time with DD_RAID (DataDomain_RAID, typical traditional RAID in DataDomain product) may be carried out. In yet a further embodiment, of the DDVS prototype, a radix tree may be used to implement a map tree for virtual disks and a remap tree for physical disks.

Figure 12:
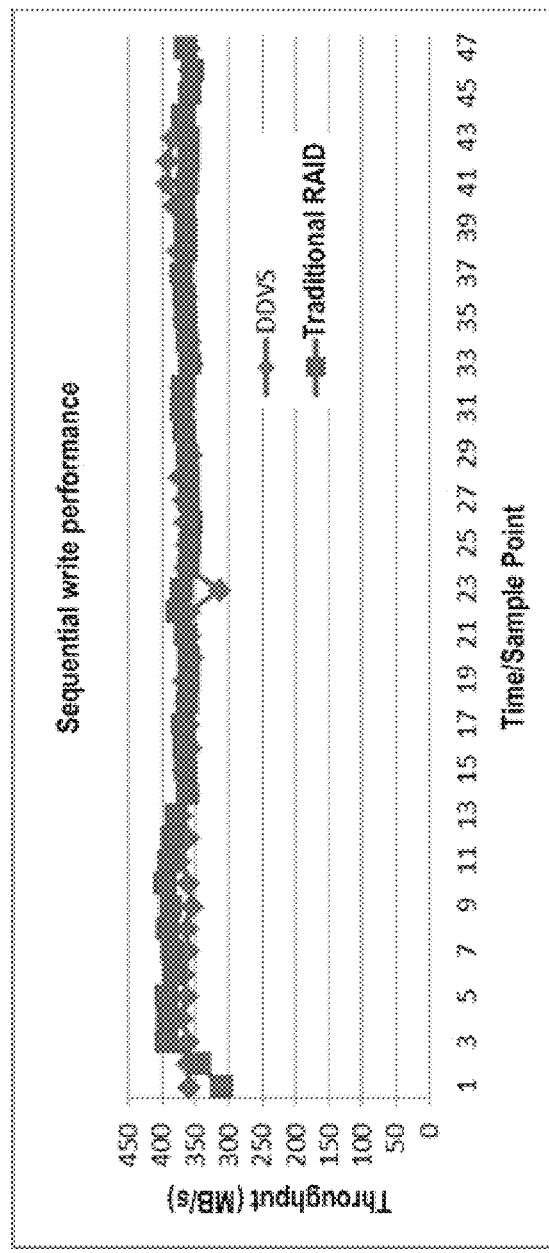
FIG. 12 shows an exemplary evaluation result for DDVS architecture.

Reference is now made to FIG. 12, which shows an exemplary metadata update overhead evaluation result between DDVS and traditional RAID. As can be seen from FIG. 12, DDVS has the same sequential write performance as the traditional RAID, and the DDVS performance is stable without major performance drop. In one embodiment, during write process, DDVS may need to update chunk metadata into the physical disk in sync mode. In a further embodiment, the metadata update overhead of DDVS may be evaluated by a sequential write testing case.

Figure 13:
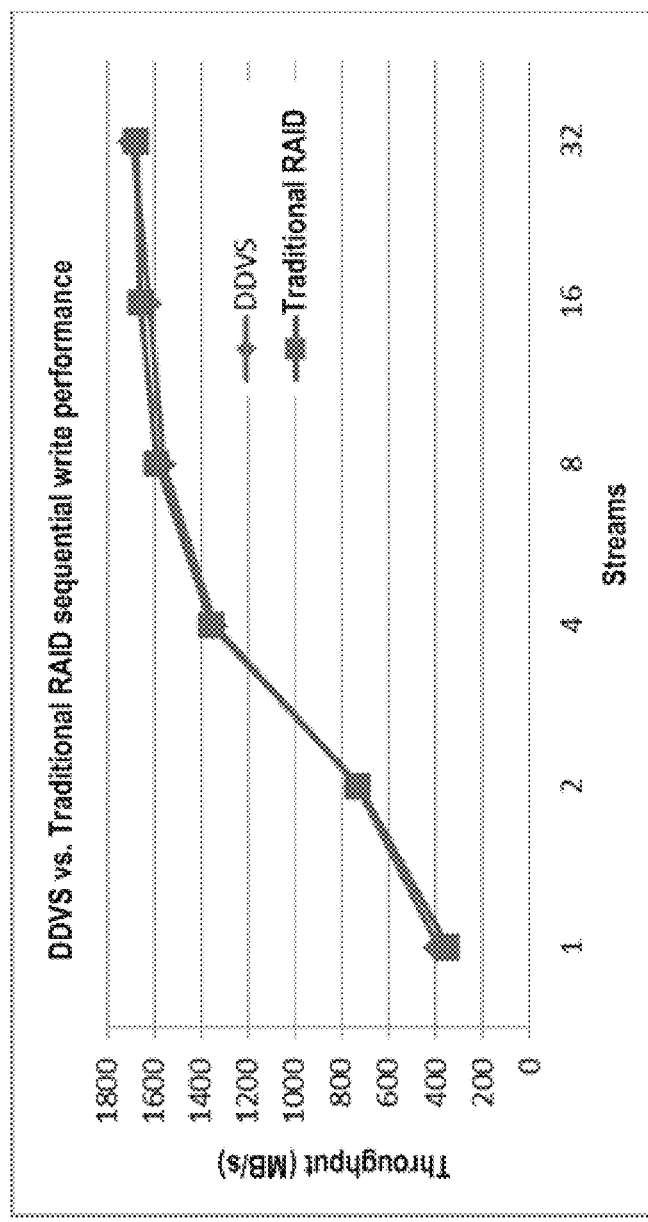
FIG. 13 shows another exemplary evaluation result for DDVS architecture.

Reference is now made to FIG. 13, which shows an exemplary sequential write performance comparison between DDVS and traditional RAID. As can be seen from FIG. 13, DDVS has the same sequential write performance as the traditional RAID. In one embodiment, sequential write performance may also be evaluated for both traditional RAID and DDVS on DataDomain product.

Figure 14:
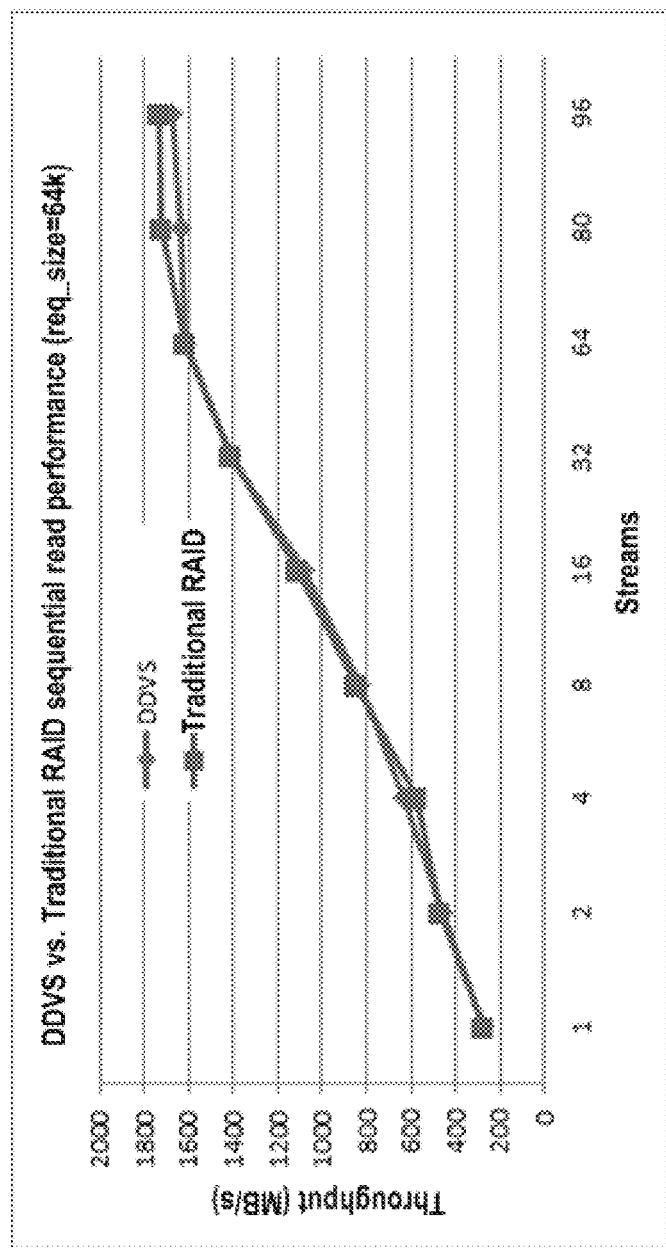
FIG. 14 shows another exemplary evaluation result for DDVS architecture.

Reference is now made to FIG. 14, which shows an exemplary sequential read performance comparison between DDVS and traditional RAID. What is shown in FIG. 14 is an exemplary write performance comparison result for 64 KB request size. In one embodiment, there may be almost no differences between DDVS and traditional RAID for sequential read performance.

Figure 15:
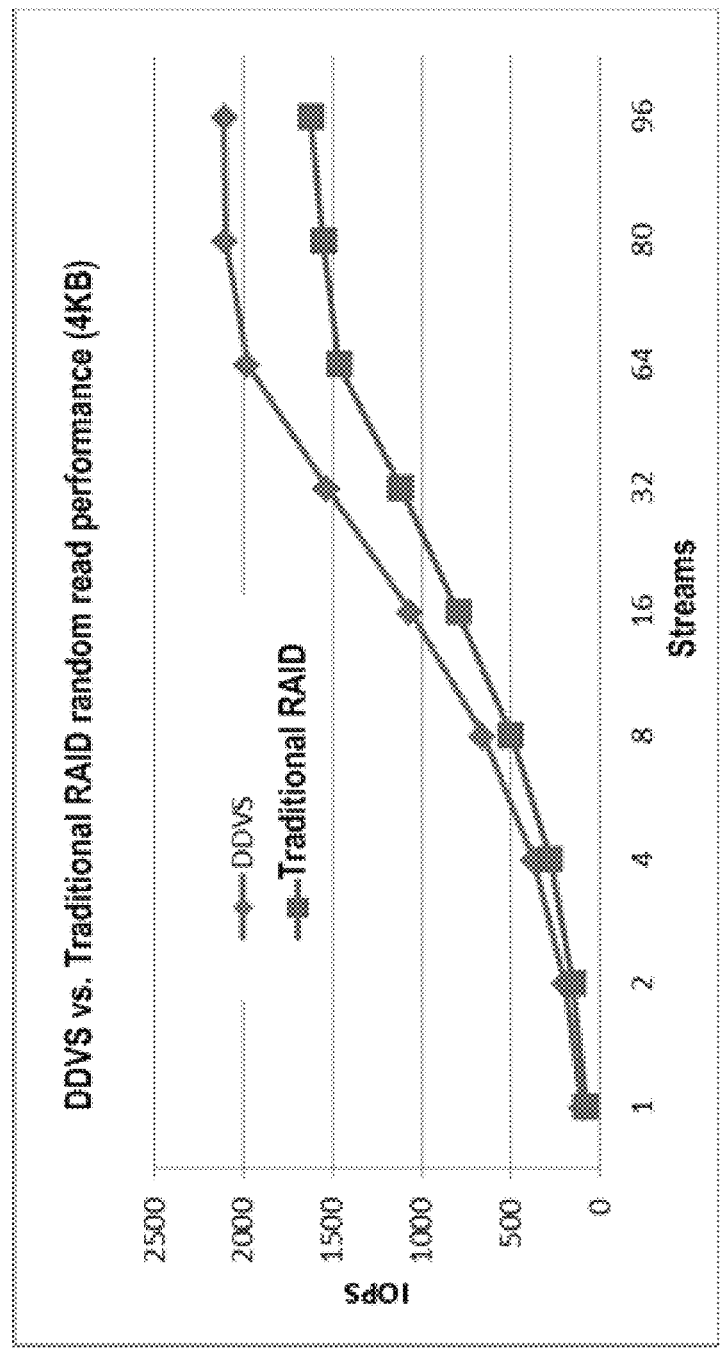
FIG. 15 shows another exemplary evaluation result for DDVS architecture.

Reference is now made to FIG. 15, which shows an exemplary random read performance comparison between DDVS and traditional RAID. In one embodiment, for random read performance, DDVS may be a little better than traditional RAID.

Figure 16:
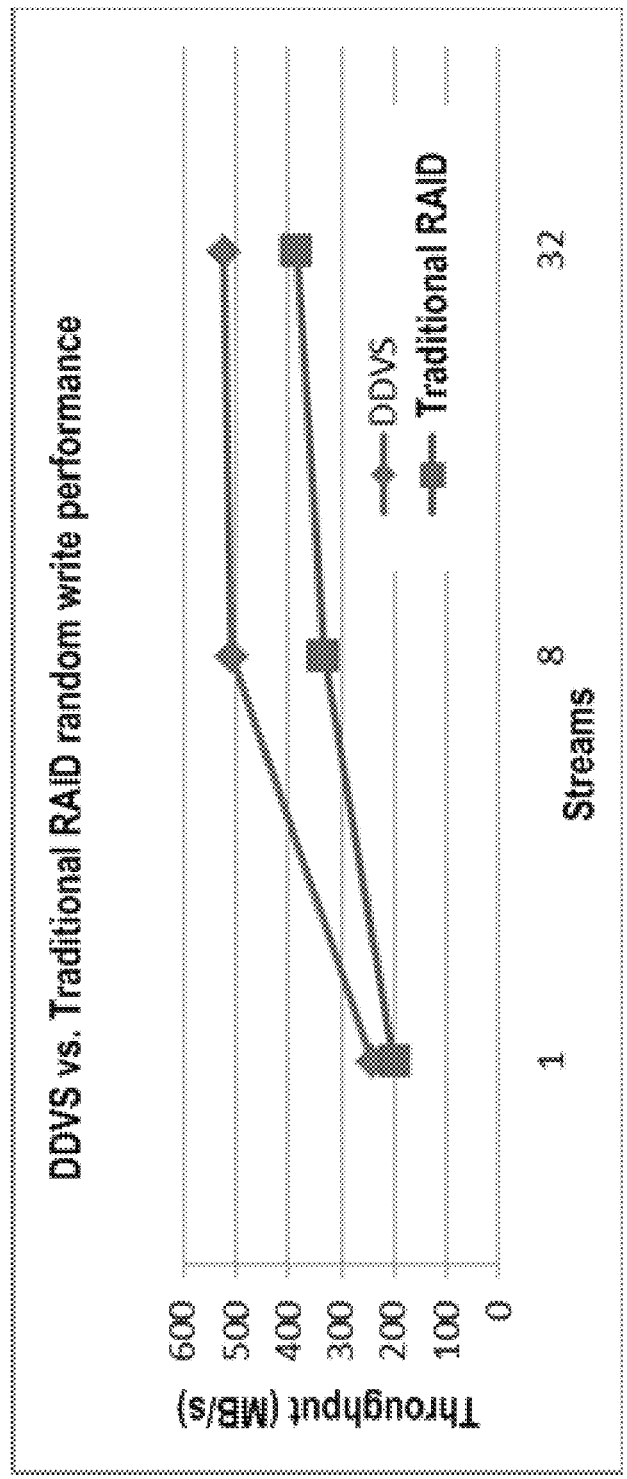
FIG. 16 shows another exemplary evaluation result for DDVS architecture.

Reference is now made to FIG. 16, which shows an exemplary random write performance comparison between DDVS and traditional RAID. In one embodiment, for random write performance, DDVS may be a little better than traditional RAID.

As can be seen from FIGS. 12 to 16, DDVS distributes data across all physical disks, but exerts no significant performance impact on the file system as compared with the traditional RAID.

Figure 17:
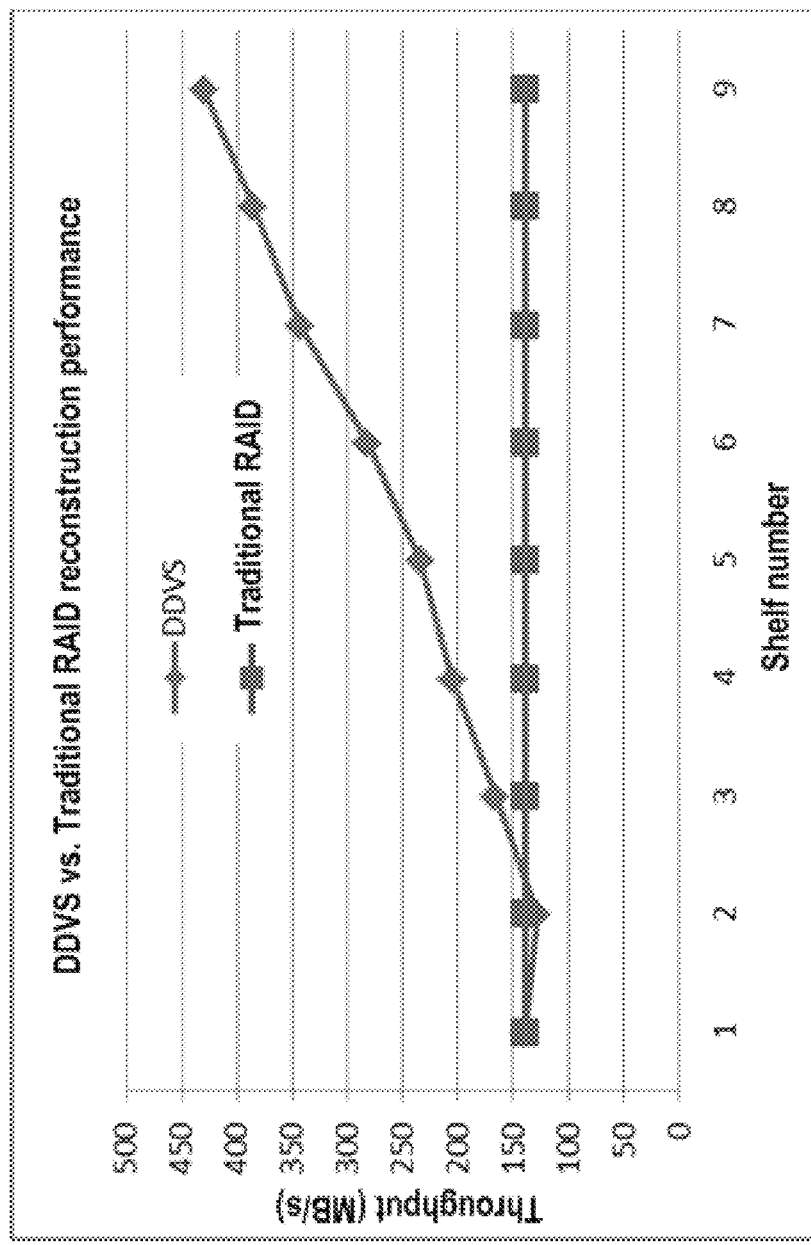
FIG. 17 shows another exemplary evaluation result for DDVS architecture.

Reference is now made to FIG. 17, which shows a reconstruction performance comparison between DDVS and traditional RAID.

In one embodiment, a major benefit of DDVS may be that reconstruction time may be reduced dramatically. In a further embodiment, a reconstruction performance comparison may be made between DDVS and traditional RAID (DD_RAID).

In a further embodiment, such as a DataDomain environment, each shelf may have 15 physical disks. In a further embodiment, as may be seen from the comparison result, the reconstruction performance for DDVS may be much better than traditional RAID. In a further embodiment, the more the shelves, the higher may be the reconstruction performance, and the lesser may be the reconstruction time.

In a further embodiment, in a large scale storage system, the reconstruction time may be reduced dramatically by using DDVS.

In one embodiment, DDVS may achieve separation of the data protection domain from the physical disk management domain. In a further embodiment, data protection may be conducted in the logical domain, and data may be distributed across all disks randomly instead of regularly distributed inside fixed disk groups.

In one embodiment, evaluation results may show that by separating the data protection domain from the physical disk management domain, the data reconstruction time for DDVS may be reduced significantly. In a further embodiment, within the configuration of nine shelves, the reconstruction performance for DDVS may be at least 3 times faster than the traditional RAID. In an additional embodiment, read/write performance for DDVS may be substantially same as the traditional RAID.

Figure 18:
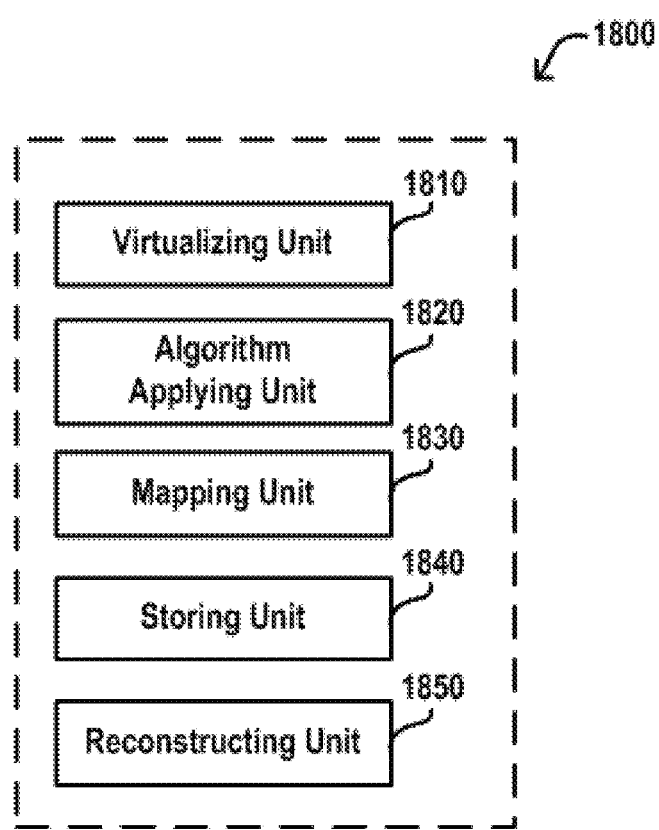
FIG. 18 shows an exemplary block diagram of an apparatus 800 for accelerating data reconstruction for a disk array according to one embodiment of the present invention.

Embodiments of the present disclosure further provide for an apparatus for accelerating data reconstruction for a disk array, the disk array including a plurality of physical disks. Reference is made to FIG. 18, which shows a block diagram of an apparatus 1800 for accelerating data reconstruction for a disk array according to one embodiment of the present disclosure.

The apparatus 1800 comprises virtualizing unit 1810 configured to virtualize the plurality of physical disks as a plurality of virtual disks; algorithm applying unit 1820 configured to apply a data protection algorithm to the plurality of virtual disks so as to obtain redundant information on data to be stored; mapping unit 1830 configured to provide a map from the plurality of virtual disks to the plurality of physical disks; storing unit 1840 configured to store, based on the map, the data and the redundant information in the plurality of physical disks according to a predetermined allocation policy; and reconstructing unit 1850 configured to, in response to at least one of the plurality of physical disks failing, achieve data reconstruction for the disk array based on the redundant information and the data in working disks among the plurality of physical disks.

Mapping unit 1830 may be further configured to provide a map from each of the plurality of blocks to a corresponding chunk in the plurality of chunks. In one embodiment, virtualizing unit 1810, algorithm applying unit 1820, mapping unit 1830, storing unit 1840 and reconstructing unit 1850 may be combined into a single disk reconstruction unit (not show in Figure), wherein the disk reconstruction unit performs the tasks associated with each of the above mentioned units.

In one exemplary embodiment, apparatus 1800 may further include a chunk dividing unit that may be configured to divide address space of each of the plurality of physical disks into a plurality of chunks, each of which may have the same storage capacity. In a further embodiment, data and redundant information may be distributed in the chunks according to a predetermined allocation policy.

In one exemplary embodiment, apparatus 1800 may further include a block dividing unit that may be configured to divide address spaces of each of the plurality of virtual disks into a plurality of blocks. In a further embodiment, each of the blocks may have the same storage capacity as each chunk.

In one exemplary embodiment, apparatus 1800 may further include a remapping unit that may be configured to provide a remap from each of a plurality of chunks to a corresponding block in a plurality of blocks.

In one exemplary embodiment, apparatus 1800 may further comprises a group dividing unit that may be configured to divide a plurality of virtual disks into a plurality of groups. The algorithm applying unit may be further configured to apply the same or different data protection algorithms to different ones of the plurality of groups.

In one exemplary embodiment, apparatus 1800 may further include a reserving unit that may be configured to reserve a predetermined number of spare chunks for each of a plurality of physical disks. In a further embodiment, reconstructing unit 1850 may be further configured to use the spare chunks to implement the data reconstruction for the disk array.

In one exemplary embodiment, a plurality of physical disks may form a physical disk management domain, and a plurality of virtual disks may form at least one data protection domain. In a further embodiment, mapping unit may be further configured to provide a map from a plurality of virtual disks to a plurality of physical disks so that a physical disk management domain may be separated from the data protection domain.

Figure 19:
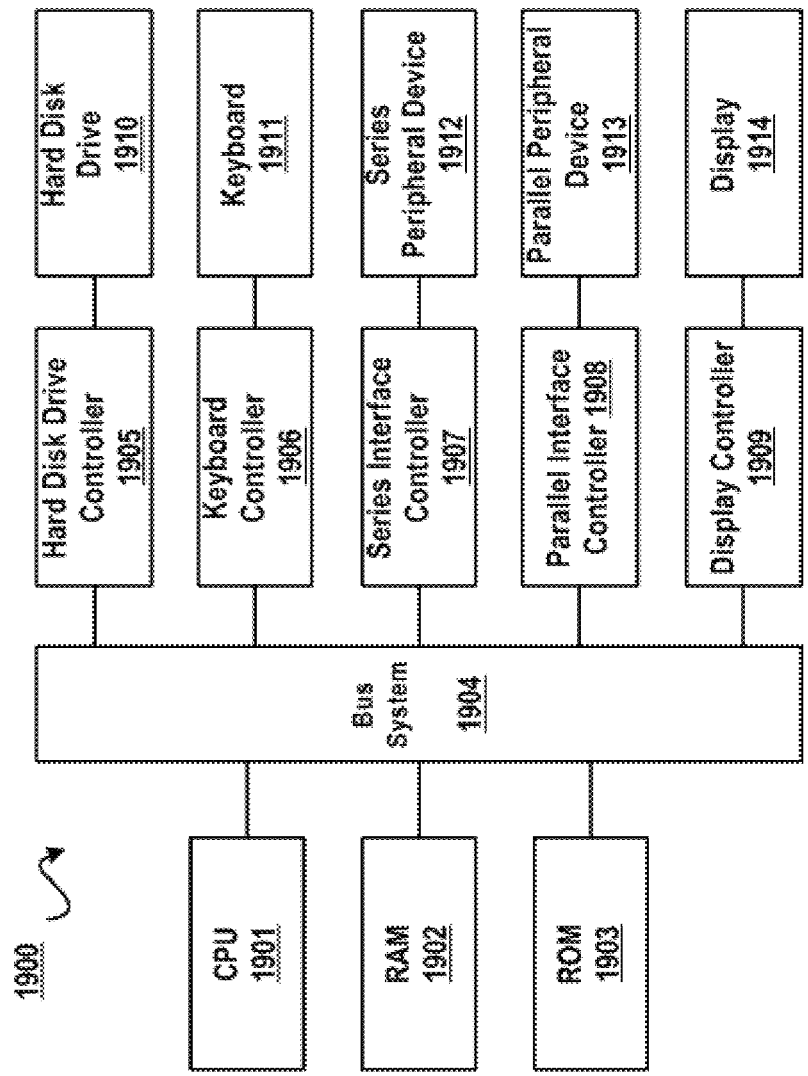
FIG. 19 shows an exemplary embodiment of a schematic block diagram of a computer system 1900 which is applicable to implement the embodiments of the present invention.

Reference is now made to FIG. 19, which shows a schematic block diagram of an exemplary computer system 1900 that is applicable to implement the embodiments of the present disclosure. The computer system 1900 may be used for implementing apparatus 1800 for accelerating data reconstruction for a disk array.

As shown in FIG. 19, the computer system 1900 includes: CPU (Central Processing Unit) 1901, RAM (Random Access Memory) 1902, ROM (Read Only Memory) 1903, system bus 1904, hard disk controller 1905, keyboard controller 1906, serial interface controller 1907, parallel interface controller 1908, display controller 1909, hard disk 1910, keyboard 1911, serial peripheral device 1912, parallel peripheral device 1913 and display 1914. Among these devices, connected to system bus 1904 are CPU 1901, RAM 1902, ROM 1903, hard disk controller 1905, keyboard controller 1906, serial interface controller 1907, parallel interface controller 1908 and display controller 1909. Hard disk 1910 is coupled to hard disk controller 1905; keyboard 1911 is coupled to keyboard controller 1906; serial peripheral device 1912 is coupled to serial interface controller 1907; parallel peripheral device 1913 is coupled to parallel interface controller 1908; and display 1914 is coupled to display controller 1909. It should be understood that the structural block diagram in FIG. 19 is shown only for illustration purpose, and is not intended to limit the scope of the present disclosure. In some cases, some devices may be added or reduced as required.

As above mentioned, apparatus 1800 may be implemented through pure hardware, for example, chip, ASIC, SOC, etc. Such hardware may be integrated into computer system 1900. Besides, the embodiments of the present disclosure may also be implemented in a form of a computer program product. For example, method 400 as described with reference to FIG. 4 may be implemented via a computer program product. This computer program product may be stored in RAM 1902, ROM 1903, hard disk 1910 and/or any suitable storage medium as illustrated in FIG. 19, or downloaded to computer system from a suitable location in a network. The computer program product may comprise computer code portions comprising program instructions that may be executed through a suitable processing device (for example, CPU 1901 as shown in FIG. 19). The program instruction at least may comprise instructions for implementing the steps of methods 300 and 400.

It should be noted that, embodiments of the present disclosure can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code may be provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory. In actuality, according to embodiments of the present disclosure, features and functions of two or more units above described may be embodied in one unit. On the contrary, the features and functions of one unit described above may be further partitioned to be embodied in more units.

Besides, although operations of the present methods may be described in a particular order in the drawings, it may not require or imply that these operations must be performed according to this particular order, or a desired outcome may only be achieved by performing all shown operations. On the contrary, execution order for the steps as depicted in the flowcharts may be varied. Additionally or alternatively, some steps may be omitted, a plurality of steps may be merged into one step for execution, and/or a step may be divided into a plurality of steps for execution.

Although the present disclosure may be depicted with reference to a plurality of embodiments, it should be understood that the present disclosure may not be limited only to the disclosed embodiments. On the contrary, the present disclosure may intend to cover various modifications and equivalent arrangements included in the spirit and scope of the appended claims. The scope of the appended claims meets the broadest explanations and covers all such modifications and equivalent structures and functions.

What is claimed is:

1. A method for accelerating data reconstruction for a disk array, the disk array comprising a plurality of physical disks, the method comprising:

dividing an address space of each of the plurality of physical disks into a plurality of chunks, each of the plurality of chunks having a same storage capacity;

virtualizing the plurality of physical disks as a plurality of virtual disks, including dividing the address space of each of the plurality of virtual disks into a plurality of blocks, each of the plurality of blocks having a same storage capacity as each chunk, the plurality of virtual disks being substantially less in number than the plurality of physical disks;

applying a data protection algorithm to the plurality of virtual disks to obtain redundant information on data to be stored;

providing a map from the blocks of the plurality of virtual disks to the chunks of the plurality of physical disks, according to the following two requirements (1) layout of the chunks on the physical disks is distributed randomly across all the physical disks so that all the physical disks participate in both regular I/O accesses and in data reconstruction upon failure of a physical disk, and (2) different stripe units of a given stripe are not stored on the same physical disk, so that failure of a single physical disk does not cause loss of more than one stripe unit of a given stripe of the virtual disks;

storing, based on the map, the data and the redundant information in the plurality of physical disks according to a predetermined allocation policy;

in response to at least one of the plurality of physical disks failing, implementing a data reconstruction for a disk array based on the redundant information and the data in working disks from amongst the plurality of physical disks; and providing a re-map from each of the plurality of chunks to a corresponding block in the plurality of blocks.

2. The method according to claim 1, further comprising: dividing the plurality of virtual disks into a plurality of groups.

3. The method according to claim 2, wherein applying a data protection algorithm to the plurality of virtual blocks further comprises:

applying the same or a different data protection algorithms to different ones of the plurality of groups.

4. The method according to claim 1, further comprising: reserving a predetermined number of spare chunks for each of the plurality of physical disks.

5. The method according to claim 4, wherein implementing data reconstruction for the disk array further comprises:

using the spare chunks to implement the data reconstruction for the disk array.

6. The method according to claim 1, wherein the plurality of physical disks form a physical disk management domain, and the plurality of virtual disks form at least one data protection domain separated from the physical disk management domain;

wherein the map from the plurality of virtual disks to the plurality of physical disks is provided within the data protection domain and is realized by a plurality of map trees, each map tree mapping the blocks of a respective virtual disk to corresponding chunks of the physical disks; and wherein the re-map from each of the plurality of chunks to a corresponding block in the plurality of blocks is provided within the physical disk management domain and is realized by a plurality of re-map trees, each re-map tree mapping the chunks of a respective physical disk to corresponding blocks of the virtual disks.

7. The method according to claim 1, further comprising, by a bad stripe collector, collecting bad stripes for the data protection domain based on the map trees and re-map trees.

8. The method according to claim 7, wherein the data reconstruction is triggered in response to a write to a physical disk failing, and further including, in addition to triggering the data reconstruction, also re-mapping the write to another physical disk.

9. The method according to claim 7, wherein the bad stripe collector is run in response to failure of a physical disk and prepares bad stripes for all data protection domains for which the failed physical disk stores data, and wherein the data reconstruction is performed for each data protection domain by associated reconstruction demons executed in parallel after the bad stripes have been prepared by the bad stripe collector.

10. A system, comprising:

a disk array comprising a plurality of physical disks wherein the disk array includes a plurality of physical disks; and computer-executable program logic encoded in memory of one or more computers enabled to accelerate data reconstruction for the disk array, wherein the computer-executable program logic is configured for the execution of:

dividing an address space of each of the plurality of physical disks into a plurality of chunks, each of the plurality of chunks having a same storage capacity;

virtualizing the plurality of physical disks as a plurality of virtual disks, including dividing the address space of each of the plurality of virtual disks into a plurality of blocks, each of the plurality of blocks having a same storage capacity as each chunk, the plurality of virtual disks being substantially less in number than the plurality of physical disks;

applying a data protection algorithm to the plurality of virtual disks to obtain redundant information on data to be stored;

providing a map from the blocks of the plurality of virtual disks to the chunks of the plurality of physical disks, according to the following two requirements (1) layout of the chunks on the physical disks is distributed randomly across all the physical disks so that all the physical disks participate in both regular I/O accesses and in data reconstruction upon failure of a physical disk, and (2) different stripe units of a given stripe are not stored on the same physical disk, so that failure of a single physical disk does not cause loss of more than one stripe unit of a given stripe of the virtual disks;

storing, based on the map, the data and the redundant information in the plurality of physical disks according to a predetermined allocation policy;

in response to at least one of the plurality of physical disks failing, implementing a data reconstruction for a disk array based on the redundant information and the data in working disks from amongst the plurality of physical disks; and providing a re-map from each of the plurality of chunks to a corresponding block in the plurality of blocks.

11. The system of claim 10, wherein the computer-executable program logic is configured further for the execution of:

dividing the plurality of virtual disks into a plurality of groups.

12. The system of claim 11, wherein applying a data protection algorithm to the plurality of virtual blocks further comprises:

applying the same or a different data protection algorithms to different ones of the plurality of groups.

13. The system of claim 10, wherein the computer-executable program logic is configured further for the execution of:

reserving a predetermined number of spare chunks for each of the plurality of physical disks.

14. The System of claim 13, wherein implementing data reconstruction for the disk array further comprises:

using the spare chunks to implement the data reconstruction for the disk array.

15. A computer program product for accelerating data reconstruction for a disk array wherein the disk array includes a plurality of physical disks, the computer program product comprising:

a non-transitory computer readable medium encoded with computer-executable code, the code configured to enable the execution of:

dividing an address space of each of the plurality of physical disks into a plurality of chunks, each of the plurality of chunks having a same storage capacity;

virtualizing the plurality of physical disks as a plurality of virtual disks, including dividing the address space of each of the plurality of virtual disks into a plurality of blocks, each of the plurality of blocks having a same storage capacity as each chunk, the plurality of virtual disks being substantially less in number than the plurality of physical disks;

applying a data protection algorithm to the plurality of virtual disks to obtain redundant information on data to be stored;

providing a map from the blocks of the plurality of virtual disks to the chunks of the plurality of physical disks, according to the following two requirements (1) layout of the chunks on the physical disks is distributed randomly across all the physical disks so that all the physical disks participate in regular I/O accesses and in data reconstruction upon failure of a physical disk, and (2) different stripe units of a given stripe are not stored on the same physical disk, so that failure of a single physical disk does not cause loss of more than one stripe unit of a given stripe of the virtual disks;

storing, based on the map, the data and the redundant information in the plurality of physical disks according to a predetermined allocation policy;

in response to at least one of the plurality of physical disks failing, implementing a data reconstruction for a disk array based on the redundant information and the data in working disks from amongst the plurality of physical disks; and providing a re-map from each of the plurality of chunks to a corresponding block in the plurality of blocks.

* * * * *